June 10, 1930.  C. W. METZGER  1,762,875
MILLING CUTTER
Filed Oct. 10, 1923   2 Sheets-Sheet 1
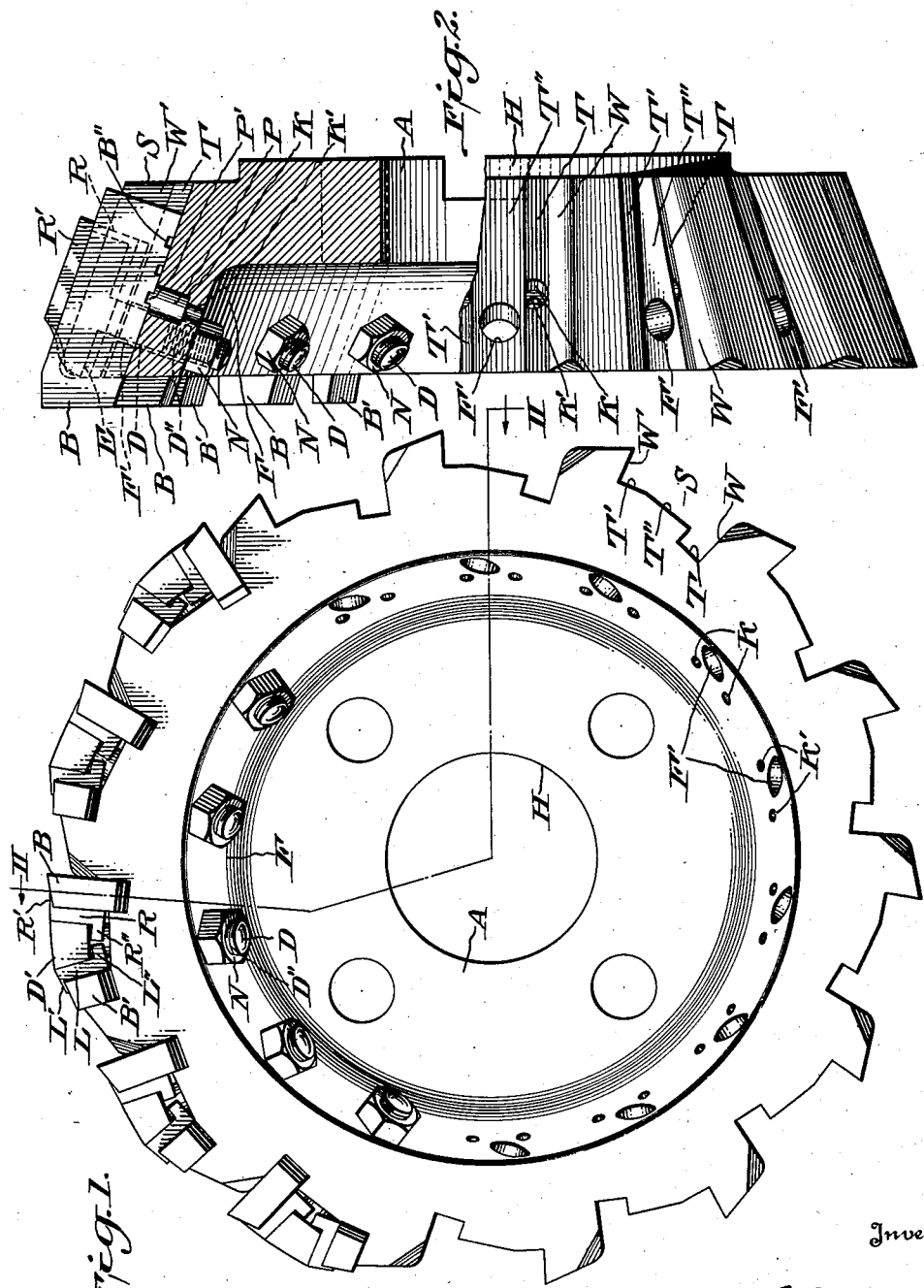

June 10, 1930.  C. W. METZGER  1,762,875
MILLING CUTTER
Filed Oct. 10, 1923   2 Sheets-Sheet 2
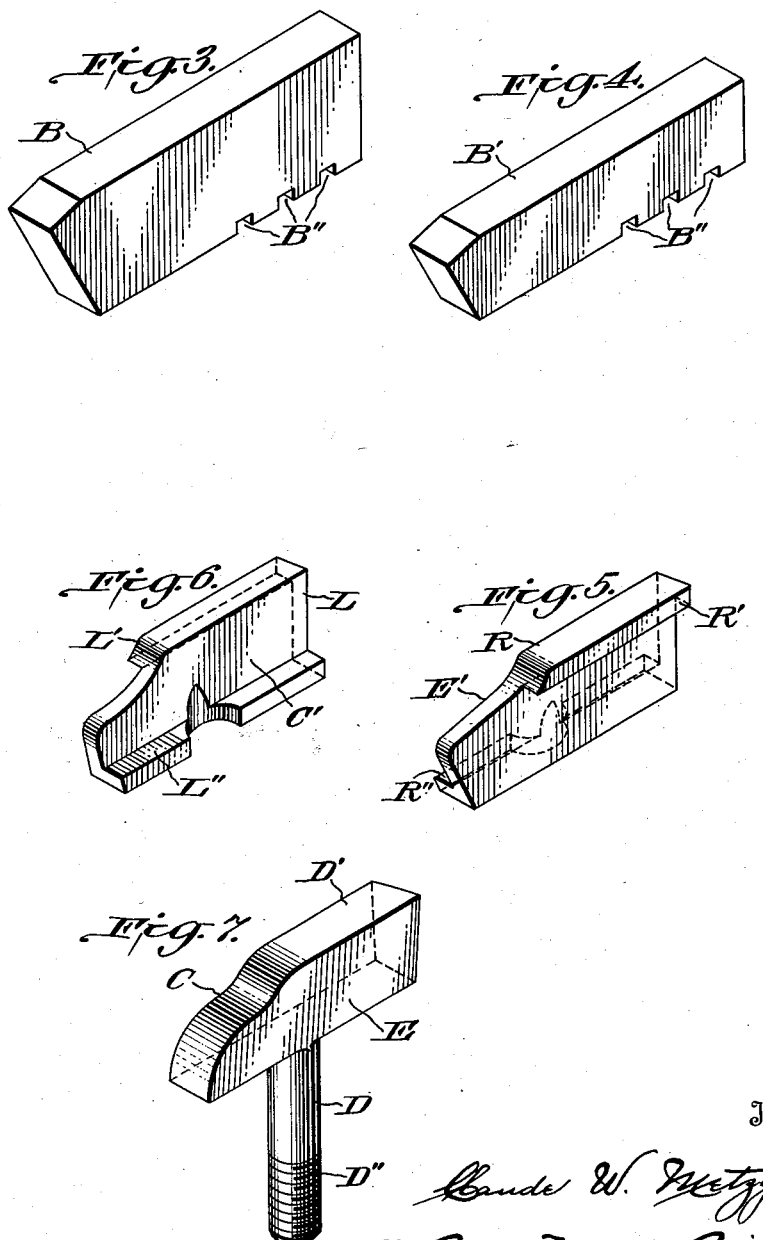

Patented June 10, 1930

1,762,875

UNITED STATES PATENT OFFICE

CLAUDE W. METZGER, OF LOS ANGELES, CALIFORNIA, ASSIGNOR, BY MESNE ASSIGN-
MENTS, TO CONSOLIDATED MACHINE TOOL CORPORATION OF AMERICA, A CORPO-
RATION OF DELAWARE

MILLING CUTTER

Application filed October 10, 1923. Serial No. 667,749.

This invention relates to milling cutter heads and more particularly to an improved milling cutter head or body having inserted teeth assembled around its periphery.

Milling cutters having adjustable inserted teeth are more economical than solid cutters because the latter must be entirely discarded when the projecting parts of the cutting teeth thereof have been worn or ground away, whereas the worn out teeth or blades of the former may be removed and new ones replaced on the old cutter body. The solid cutter, however, has a decided advantage over the inserted-tooth cutter in that its teeth, being integral with the body, cannot work loose or vibrate. In constructing inserted-tooth cutters, it has been the aim to rigidly clamp the blades in place but those now in use generally give trouble when removing metal at extraordinary speeds with high speed cutting metal blades, such as stellite, because of the hammer blows on the cutting edges and the unusual shocks that the blades, cutter body and holding devices must withstand. The cutter head or body has been made of unhardened or soft steel, but the accuracy of the slots, face and hole in a relatively soft supporting body cannot be maintained in use. When bodies having hardened slots are employed it requires much greater accuracy and expense to obtain a perfect fit between the slots and blades and many blades are damaged or broken when they are being fitted or adjusted in the head.

The object of the present invention is to provide a milling cutter head or body suitable for use with blades made of high-speed cutting metal, such as stellite, i. e., a body that does not require extremely accurate initial machining of blades and slots but will nevertheless firmly hold such blades in place, properly spaced and locked in the correct position to remove metal freely and without vibration of the blades that may occur from the shock and strain of the cutting action.

Broadly speaking, the improved cutter comprises a hardened steel body having transverse slots in its periphery providing seats for pairs of blades of high speed cutting metal, such blades being rigidly held in place by clamping and wedging means providing an equalizing vise grip, whereby the blades may be readily loosened and as readily fastened to permit easy adjustment, removal and replacement thereof.

The objects and novel features of this invention will be apparent from the following description taken with the accompanying drawings, in which Fig. 1 is a face view of a milling cutter embodying this invention;

Fig. 2 is a side view of the same, partly in section on the line II—II of Fig. 1;

Figs. 3 and 4 are perspective views illustrating types of cutter blades employed;

Figs. 5 and 6 are perspective views illustrating improved clamps employed for holding the blades on their seats; and Fig. 7 is a perspective view of an improved wedge bolt employed for wedging the blades in place and securing them and the clamps to the supporting body.

Referring to the drawings, the hardened steel supporting body A of the improved milling cutter may consist of a hub H adapted to be keyed to the rotatable shaft of a milling machine. The outer periphery of an integral flange F on the hub has a series of transverse slots S formed therein which provide spaced substantially parallel walls W and W' and adjoining seats or faces T and T' between such walls, inclined rearwardly toward the axis of the body A. The seats T, T' are thus arranged in pairs in the slots S about the periphery of the supporting body, and each slot is therefore designed to accommodate a pair of blades. These seats may be located at different depths in the flange F and support pairs of blades B, B' of high speed cutting metal, such as stellite, as shown in Figs. 3 and 4. As seen in Figs. 1 and 2, the blades B, B' bear upon their seats along their narrow edges, overhanging that face and periphery of the cutter body which is of the larger diameter. In order to prevent slippage of the blades lengthwise of their seats, and provide a gauge for the correct extension of the blades when adjustment is required because of wear or removal of metal in sharpening them from the cutting end, the inner edge of each blade may be provided with a series of notches B″ any one of which may engage a projection P′ of a cylindrical plug P set in a socket K formed in the bottom of each seat. A smaller hole K′ extends from the socket K to the inner side of the flange F so that the plug P may be driven out when it becomes necessary to change it.

The blades B, B′ may be held in place on the supporting flange F by improved clamping means which hold them down upon their seats and firmly against the walls W, W′, respectively. A clamping means is associated with each pair of blades and comprises a pair of clamping members or adjustable jaws R and L and a wedge bolt D that may be secured to the flange F and drawn between the jaws R and L to force them inward and wedge them apart, and thereby hold the blades down on their seats and against the side walls, W, W′ of the slot S, thus providing an equalizing vise grip equivalent but superior to a drive fit for holding the blades. The jaws R and L desirably have flanges R′ L′ at their outer ends, respectively, adapted to hook over the outer edges of the blades B, B′ to provide positive means for engaging such blades and drawing them inwardly and holding them against their seats. The inner ends of the jaws R and L may also have flanges R″ and L″ which underlap or project under the inner end of the wedge head D′ of the bolt D to retain the jaws in position. The jaws are thus desirably Z-shape in cross-section and may be approximately as long as the portions of the blades in the slots, so that the gripping pressure thereof will be uniformly distributed along the blades and pivoting of the latter at any points will be entirely eliminated. Furthermore, these jaws, in effect, provide adjustable side walls cooperating with the walls W and W′ to form individual slots for the blades B and B′, thus eliminating the need of extremely accurate and expensive machining of blades and slots.

The head of the wedge bolt has inclined longitudinal faces C and E adapted to engage correspondingly inclined faces C′ and E′ of the jaws R and L throughout substantially their entire length to properly equalize the gripping pressure and hold the jaws against the blades and the latter against their seats and the fixed side walls W, W′ when the bolt is tightened into place. The wedge bolt D has a shank D″ which extends inwardly through a hole F′ in the flange F and may be engaged by suitable securing means, such as a nut N, that engages a threaded portion of the shank D″ and bears against the inner surface of the flange F, whereby the head D′ may readily be drawn inwardly to exert the desired wedging pressure against the clamping jaws and blades. With this arrangement, any pair of blades may be readily removed and changed by merely loosening the nut N or other securing means employed.

It will be evident that the cutter may be properly assembled by means of a suitable wrench, and no hammering, press fitting or accurate machining are required, thus reducing the labor and practically eliminating damage in assembling such cutters and providing an inserted-tooth cutter which practically has the rigidity of a solid cutter.

I claim:

1. A rotary cutter comprising a supporting body having transverse slots in its outer periphery, each slot including opposed walls and seats adjacent said walls, cutter blades positioned on said seats and abutting against said walls, and means secured to said body and engaging the outer edges of said blades to hold them inwardly against their seats and exerting lateral pressure against such blades to clamp them against said walls.

2. A rotary cutter comprising a supporting body having transverse slots in its outer periphery providing pairs of opposed walls and a pair of seats between each pair of such walls, a pair of cutter blades positioned on the seats in each slot and severally abutting against the walls of such slot, and means secured to said body and projecting over the outer edge and between each pair of blades to hold them inwardly against their seats and clamp them against the adjoining walls.

3. A rotary milling cutter comprising a supporting body having transverse slots in its periphery providing pairs of walls and seats between such walls, a pair of blades positioned on the seats in each slot and severally abutting against the walls of such slot, jaws Z-shaped in cross section, for holding the blades on their seats, and means secured to said body and bearing against said jaws to clamp the blades to said body.

4. A milling cutter comprising a supporting body having transverse slots in its periphery providing walls and seats adjacent said walls, blades positioned on said seats and adjacent said walls, jaws having means hooking over the outer edges of said blades and faces abutting against the same, and wedge bolts secured to said body and bearing against said jaws and blades to rigidly hold the latter against their seats and also against the walls adjoining them.

5. A milling cutter comprising a supporting body having a circular series of parallel transverse slots providing walls and seats adjacent said walls, blades on said seats and abutting against said walls, Z-shaped elongated jaws hooking over the outer edges of said blades and having faces abutting against said blades, and bolts secured to said body and having elongated wedge-shaped heads underlapped by portions of said jaws and bearing against said jaws to clamp them and the blades to said body.

6. A rotary cutter comprising an annular supporting body having transverse seats on its periphery and sockets in the bottoms of and substantially perpendicular to said seats, cutter blades on said seats having spaced notches in the bottom edges thereof, plugs fitting said sockets having outer ends thereof adapted to engage the notches in said blades to lock the latter against movement, the inner ends of such plugs being accessible for removing them from said sockets, and means secured to said body for rigidly holding the blades on their seats with said plugs and said notches interlocked.

7. A rotary cutter comprising a supporting body having transverse slots in its periphery providing seats, projections rising from said seats, blades on said seats having spaced notches along their seat-engaging edges adapted to receive said projections, and means secured to said body gripping said blades and holding them against their seats with said projections and notches interlocked.

In testimony whereof, I affix my signature.

CLAUDE W. METZGER.